United States Patent

Noma et al.

[11] Patent Number: 6,134,133
[45] Date of Patent: Oct. 17, 2000

[54] PIEZOELECTRIC TRANSFORMER INVERTER

[75] Inventors: Takashi Noma, Nagaokakyo; Ichiro Yamawaki, Omihachiman; Yasuyuki Morishima, Kyotanabe, all of Japan

[73] Assignee: Murata Manufacturing Co., Ltd., Japan

[21] Appl. No.: 09/389,286

[22] Filed: Sep. 2, 1999

[30] Foreign Application Priority Data

Sep. 29, 1998 [JP] Japan .................................. 10-274751

[51] Int. Cl.[7] .................................................. H02M 7/538
[52] U.S. Cl. ............................................................ 363/134
[58] Field of Search ........................... 363/134; 323/266, 323/284; 315/55, 209 PZ

[56] References Cited

U.S. PATENT DOCUMENTS 4,459,505  7/1984  Lim ......................................... 310/318

FOREIGN PATENT DOCUMENTS 6167694  6/1994  Japan .
9107684  4/1997  Japan .

*Primary Examiner*—Shawn Riley
*Attorney, Agent, or Firm*—Ostrolenk, Faber, Gerb & Soffen, LLP

[57] ABSTRACT

A piezoelectric transformer inverter includes an inverter unit and a step-down chopper unit. The inverter unit includes a ceramic piezoelectric transformer whose secondary terminal is to be connected to a fluorescent tube, a drive unit which is connected to a primary terminal of the ceramic piezoelectric transformer, and an inverter control circuit for controlling luminance of the fluorescent tube to a desired value. The step-down chopper unit includes a switching device which is disposed on the side where the voltage of the inverter unit is input, a free wheeling device connected between the switching device and a reference potential, and a PWM feedback control circuit for providing a feedback control to maintain an average voltage of the rectangular-wave voltage of the switching device constant. In the piezoelectric transformer inverter, even when the feedback control by the PWM feedback control circuit is impossible, the on-duty of the chopper unit is restricted so that it is not greater than a given amount.

7 Claims, 6 Drawing Sheets

PIEZOELECTRIC TRANSFORMER INVERTER

BACKGROUND OF THE INVENTION

1. Field of the Invention

The present invention relates to a piezoelectric transformer inverter, and more particularly to a piezoelectric transformer inverter for lighting a cold cathode fluorescent tube used in a liquid crystal display panel of a notebook-size personal computer or the like.

2. Description of the Related Art

Examples of a piezoelectric transformer inverter used for lighting a cold cathode fluorescent tube in a liquid crystal back-lighting have been described in Japanese Unexamined Patent Publication No. 6-167694 and Japanese Unexamined Patent Publication No. 9-107684. In Japanese Unexamined Patent Publication No. 6-167694, luminance of the cold cathode fluorescent tube is adjusted by controlling tube current of the cold cathode fluorescent tube used for back-lighting. In this case, by using the frequency-step-up ratio characteristics of a piezoelectric transformer, the tube current can be controlled. For example, when a small amount of the tube current is required, or the input voltage is high, control is such that a certain amount of tube current can be obtained by changing an inverter frequency into a frequency higher than a resonance frequency of the piezoelectric transformer.

In this system, however, when the input voltage is high, the inverter frequency is significantly deviated from the resonance frequency of the piezoelectric transformer. In a piezoelectric transformer, the highest conversion efficiency is gained when the frequency is slightly within the high frequency side of the resonance frequency. In contrast, when the frequency is deviated from this position, the conversion efficiency is lowered. As a result, in this system, the higher the input voltage, the greater the degree of the efficiency reduction, whereby only a range of approximately twice the input voltage is applicable for practical use.

In addition, regarding a piezoelectric-transformer drive circuit described in Japanese Unexamined Patent Publication No. 9-107684, a chopper circuit is inserted in the front stage of an inverter unit so as to maintain an average input voltage which is applied into the inverter unit constant. This arrangement permits the aforementioned problems of the conventional art to be solved, whereby appropriate efficiency can be maintained even in a wider range of input voltage.

In this piezoelectric-transformer drive circuit, however, there are problems as described below, when it is used in a notebook-size personal computer or the like. For example, when the input voltage applied into an inverter is set to 7 through 20V, as represented by a waveform A in FIG. 5, and the average voltage of output of a chopper circuit is set to 6.5V, there is provided an assumption that first, when the notebook-size personal computer is battery-driven, the input voltage is set to 7V as the worst condition. In this case, the duty of the chopper-circuit output is, as represented by a waveform B in FIG. 5, indicated by the formula: D=6.5/7=93%. Now, in this state, it is assumed that an AC adapter is inserted, thereby input voltage rises up to 20V as the worst condition. At this moment, the duty of output of the chopper circuit needs to be changed as follows:

$$D=6.5/20=33\%.$$

However, since a feedback control is given to maintain output voltage of the duty of the chopper circuit constant, there is a time lag in the control response. As a result, in fact, as represented by a waveform C in FIG. 5, control release occurs for some time after an abrupt change in the input voltage, whereby the inverter average output voltage increases transitionally. At this moment, the drain voltage of an FET of the inverter unit is higher than that in a normal condition, as represented by a waveform D in FIG. 5. Consequently, in order to be tolerant of higher transitional input voltages, it is necessary to use an FET in the inverter unit which can withstand such higher voltages, so that this leads to the disadvantage of larger size.

FIG. 6 is a block diagram showing a piezoelectric transformer inverter for preventing the above-described transitional phenomenon. In order to avoid such a phenomenon, the piezoelectric transformer inverter shown in FIG. 6 can be considered. In the piezoelectric transformer inverter shown in FIG. 6, without inserting the chopper as described above, a DC-DC converter control unit 13 is inserted in the front stage of an inverter unit 12 for driving a cold cathode fluorescent tube 11. The DC—DC converter control unit 13 controls a switching transistor 16, and the switching transistor 16 controls voltage which is input in the inverter unit 12.

In addition, a diode 17 is a free wheeling device, which is connected between the output electrode of the switching transistor 16 and a ground. In the example shown in FIG. 6, a coil 14 is required to be inserted between the switching transistor 16 and the inverter unit 12, and a capacitor 15 is required to be inserted between the input side of the inverter unit 12 and a ground. Furthermore, a loss due to current flowing into the coil 14 is large and there are no advantages in terms of size and efficiency, compared with the method of inserting a chopper.

SUMMARY OF THE INVENTION

The present invention can solve the problem associated with the conventional piezoelectric transformer inverter and provides a piezoelectric transformer inverter, which can control a sharp increase in the chopper-circuit average output when an abrupt change in the input voltage occurs.

The piezoelectric transformer inverter comprises an inverter unit and a step-down chopper unit. The inverter unit includes a ceramic piezoelectric transformer whose secondary terminal is to be connected to a fluorescent tube, a drive unit which is connected to a primary terminal of the ceramic piezoelectric transformer, and an inverter control circuit for controlling luminance of the fluorescent tube to set to a desired value. The step-down chopper unit inputs a signal to the drive circuit of the inverter unit and includes a switching device which is connected between an input voltage and a free wheeling device. A pulse width modulation (PWM) feedback control circuit is provided for providing feedback control to the switching device to maintain an average voltage of the rectangular-wave voltage of the switching device constant. In the piezoelectric transformer inverter, even when the feedback control by the PWM feedback control circuit is impossible, means are provided for restricting the duty cycle of the chopper unit so that it is not greater than a given amount.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
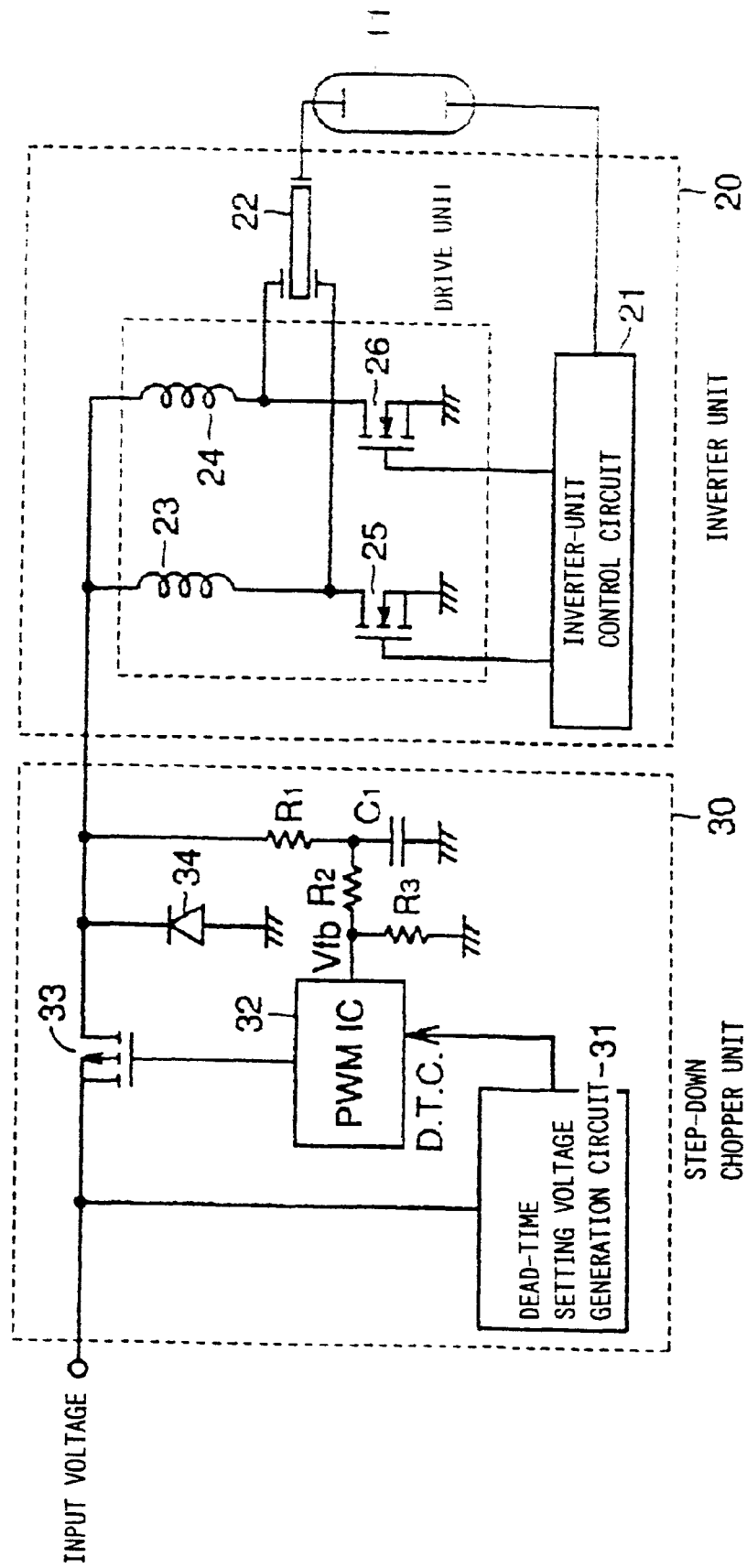
FIG. 1 is a block diagram of a piezoelectric transformer inverter according to an embodiment of the present invention.

FIG. 1 is a block diagram of a piezoelectric transformer inverter according to an embodiment of the present invention. In FIG. 1, the piezoelectric transformer inverter comprises an inverter unit 20 and a step-down chopper unit 30. The secondary electrode of a piezoelectric transformer 22 of the inverter unit 20 is connected to a cold cathode fluorescent tube 11, which is lit by the output voltage of the piezoelectric transformer 22. The inverter unit 20 includes an inverter-unit control circuit 21, in which a drive unit comprising a series circuit composed of a coil 23 and a switching transistor 25 and a series circuit composed of a coil 24 and a switching transistor 26.

In other words, the inverter-unit control circuit 21 controls driving frequencies or driving duties of the control signals given to the switching transistors 25 and 26 in such a manner that the luminance of the cold cathode fluorescent tube 11 is maintained constant. The switching transistors 25 and 26 perform switching in response to the control signal from the inverter-unit control circuit 21 so as to supply driving signals to a primary electrode of the piezoelectric transformer 22 through the coils 23 and 24.

The step-down chopper unit 30 chops the input voltage of the inverter unit 20 by a switching transistor (FET) 33 and a diode as a free wheeling device 34. The switching transistor 33 turns ON or OFF in response to the control signal from a PWM-IC (pulse width modulation—integrated circuit) 32, in which pulse-width modulation has been performed to the control signal. A rectangular output signal of the step-down chopper unit 30, which can be obtained by turning the switching transistor 33 ON or OFF, is turned into DC by a low pass filter comprising a resistor R1 and a capacitor C1 connected between the input of the inverter unit 20 and a ground. Then, the direct-current voltage is divided by resistors R2 and R3 to be input as a feedback voltage VfB to the PWM-IC 32.

The PWM-IC 32 contains a dead-time control terminal DTC, to which a dead-time setting voltage capable of varying a dead-time setting with respect to input voltage is supplied from a dead-time setting voltage generation circuit 31. Regardless of feedback voltage, the dead-time controlling function of the PWM-IC 32 functions to limit the duty ratio of the output to not greater than a specified value.

A description will be provided of the detailed operation of an embodiment of this invention shown in FIG. 1. In a normal operation, a chopper voltage, which is output from the switching transistor 33, is turned into a DC form by the low pass filter composed of the resistor R1 and the capacitor C1; and the feedback voltage VfB, which is obtained from the voltage divider formed by the resistors R2 and R3, is input to the PWM-IC 32. A reference voltage generated inside the PWM-IC 32 is compared with the voltage VfB in such a manner that both values are equal. This arrangement permits the average voltage of the output of the step-down chopper unit 30 to be maintained constant regardless of input voltage.

Meanwhile, the dead-time setting voltage generation circuit 31 allows the voltage applied to the dead-time controlling terminal DTC of the PWM-IC 32 to change according to input voltage. The setting is such that a duty determined by voltage of the dead-time control terminal DTC is always larger than a duty in the case in which the feedback control normally functions.

In a normal operation, the output duty is determined by the above-mentioned feedback control so as to obtain a given amount of chopper output voltage. Now, when the input voltage abruptly changes, the feedback control is released and the duty is expanded to the duty determined by the voltage of the dead-time controlling terminal DTC. However, when the duty is set to be close to the duty determined by the feedback as much as possible, even in the case of an abrupt change in input voltage, the average voltage of output of the step-down chopper unit 30 is only a little higher than that in the normal operation. Accordingly, in contrast with the conventional art, the withstand voltage of the FETs as the switching transistors 25 and 26 of the inverter unit can be reduced, whereby, miniaturization and high efficiency can be achieved.

Figure 2:
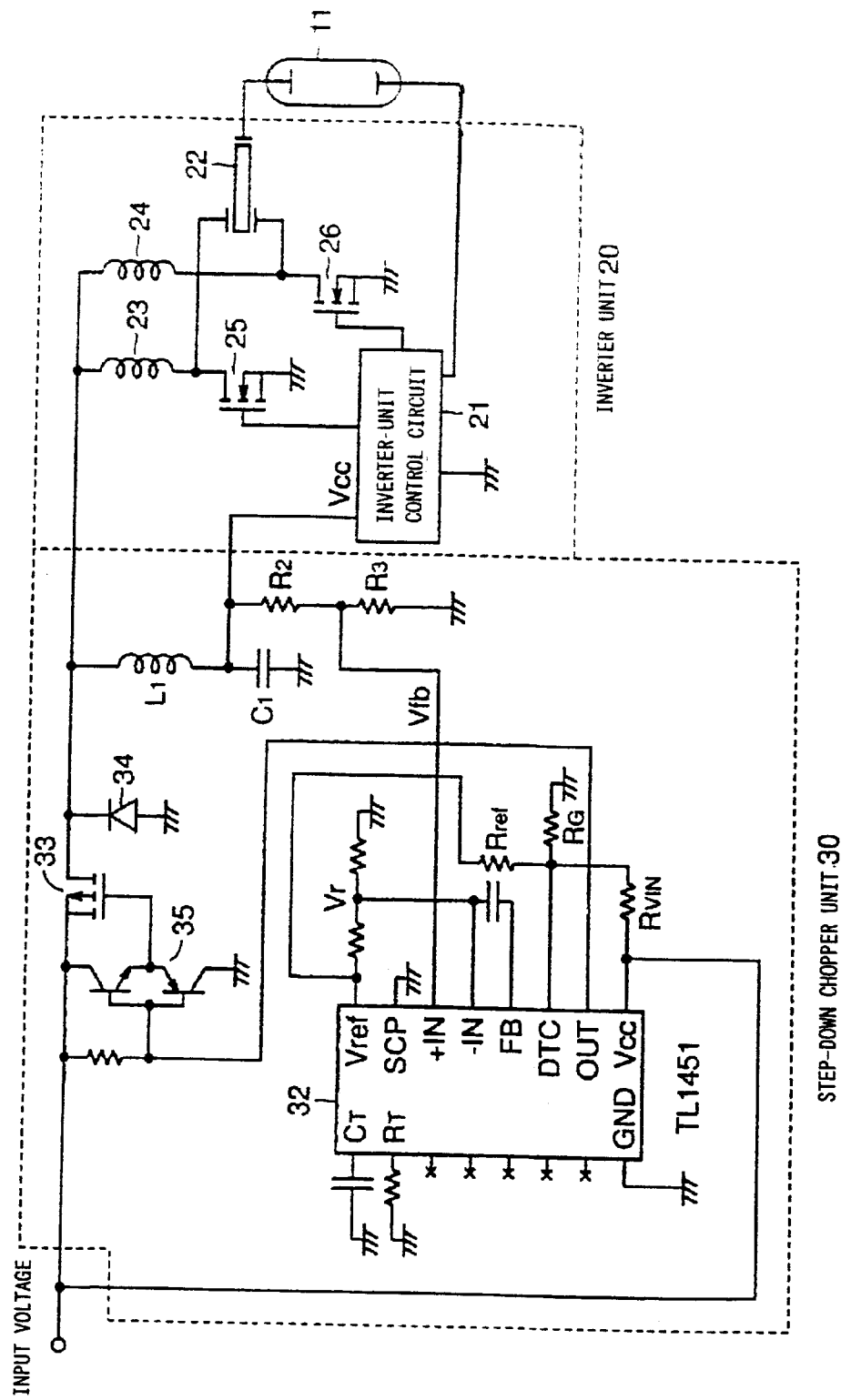
FIG. 2 is a circuit diagram showing the detailed structure of the piezoelectric transformer inverter shown in FIG. 1.

FIG. 2 shows a view illustrating a more detailed structure of the embodiment according to the present invention. In FIG. 2, the inverter unit 20 has the same structure as that shown in FIG. 1, in which the step-down chopper unit 30 is shown more specifically. As the PWM-IC 32 shown in FIG. 1, a TL 1451 (manufactured by Texas Instruments) is used. A resistor Rref is connected between the dead-time controlling terminal DTC and the reference voltage terminal Vref; a resistor $R_{VIN}$ is connected between a power supply terminal Vcc, to which input voltage is supplied, and the dead-time controlling terminal DTC; and a resistor $R_G$ is connected between the dead-time controlling terminal DTC and a GND, whereby a dead-time control voltage varying with respect to input voltage is supplied.

The PWM output voltage from the PWM-IC 32 is input to the gate of the switching transistor 33 through a circuit 35 in which an NPN transistor and a PNP transistor are combined. A series circuit composed of a coil L1 and a capacitor C1 is connected between the output side of the switching transistor 33 and a ground to rectify a rectangular wave, which is a chopper voltage, and resistors R2 and R3 divide the voltage to give the feedback voltage Vfb to the PWM-IC 32.

Figure 3:
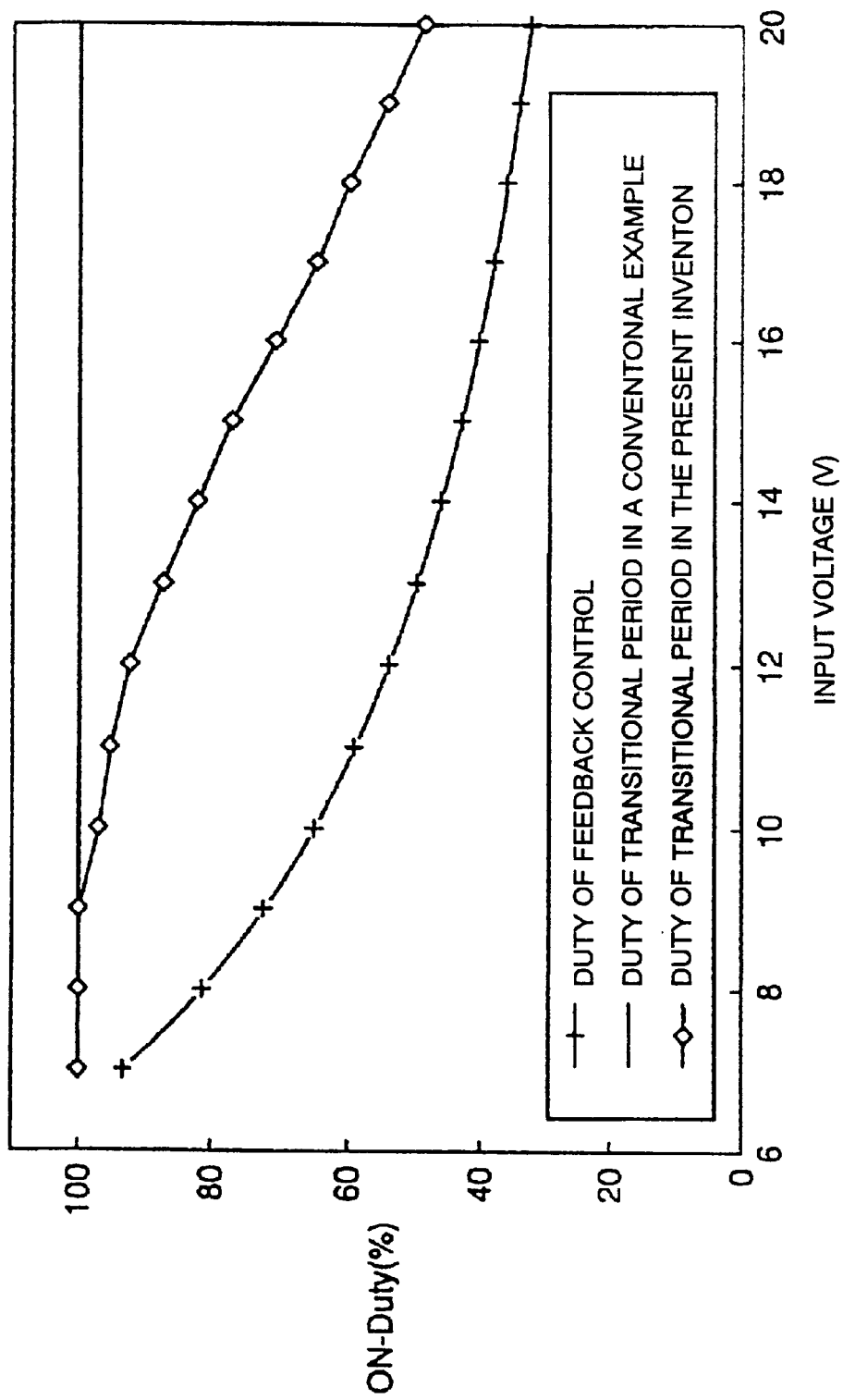
FIG. 3 shows a view illustrating a duty-restriction function according to the embodiment of the present invention.
Figure 4:
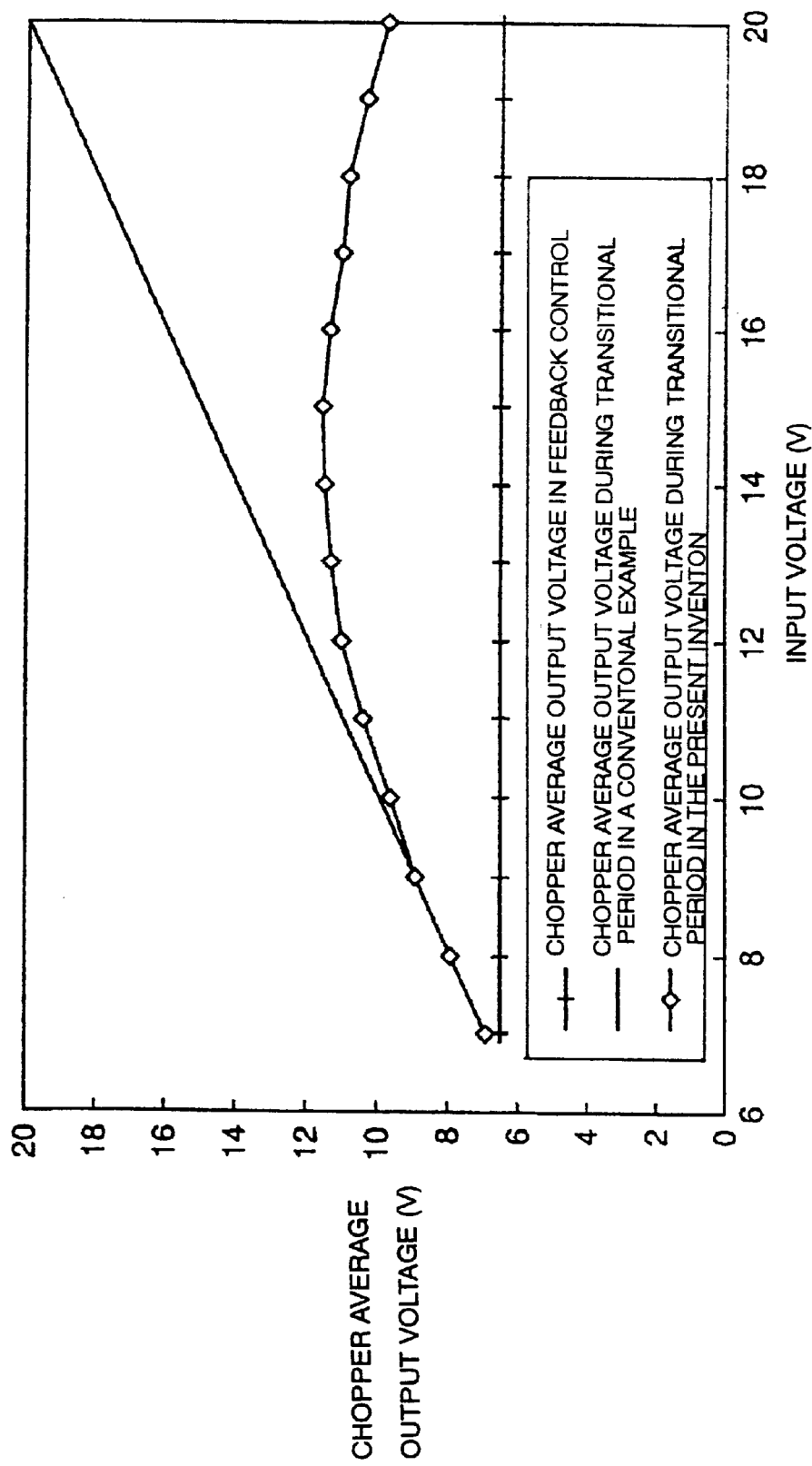
FIG. 4 shows a view illustrating a restriction function of the average output-voltage of a chopper unit according to an embodiment of the present invention.

FIG. 3 shows a view illustrating a duty-restriction function according to the embodiment of the present invention, and FIG. 4 shows a view illustrating a restriction function of the chopper-unit average output voltage.

Referring now to FIGS. 2 though 4, a description will be given of the more detailed operation of the embodiment of the present invention. The step-down chopper unit 30 performs a switching of input voltage by the switching transistor 33 and the free wheeling diode 34; the rectangular wave obtained by the switching is rectified by the coil L1 and the capacitor C1, then voltage division is performed by the resistors R2 and R3; and the feedback voltage Vfb is input to the PWM-IC 32 The PWM-IC 32 compares the feedback voltage Vfb with a voltage Vr which divides a reference voltage Vref so that a switching duty is adjusted in such a manner that Vr is equal to Vfe.

In a normal situation, such an operation allows a constant voltage to be output to the average output voltage of the step-down chopper unit 30. In contrast, when the input voltage abruptly changes, the feedback control is released and it is switched with a duty determined by the voltage of the dead-time control terminal DTC. An example of this situation is shown in FIGS. 3 and 4. In the conventional example, since there is no dead-time controlling function, when the feedback control is released, there is a possibility in which the duty turns to be 100%, as shown in FIG. 3. As a result, when input voltage is 20V, the chopper output voltage can also be 20V, as shown in FIG. 4.

In contrast with this, according to the embodiment of the present invention, as shown in FIG. 3, it can be seen that the higher the input voltage, the more restricted the duty width. This permits the chopper average output voltage to be maintained to substantially 11V in the entire range of 7V through 20V, as shown in FIG. 4. As described above, it is possible to use a high-performance FET, in which a withstand voltage is low and ON-resistance is also reduced, as an FET used for the switching transistors 25 and 26 of the inverter unit 20.

Figure 5:
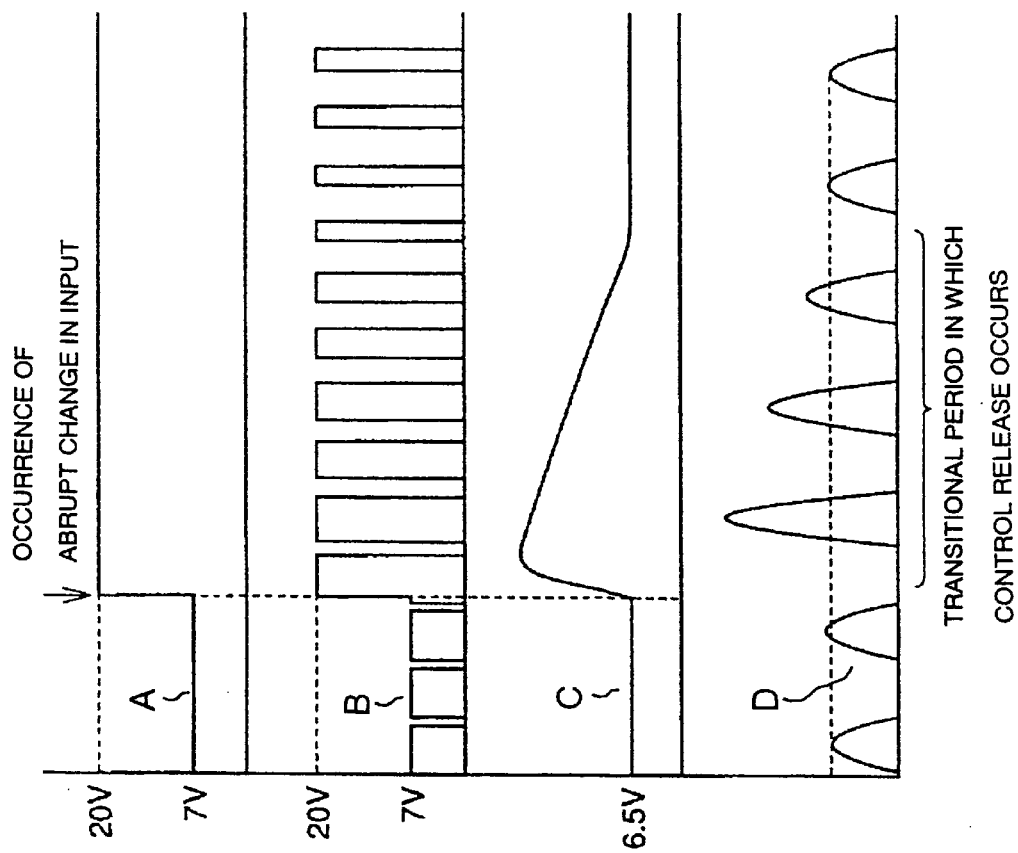
FIG. 5 is a view for illustrating problems of a conventional piezoelectric transformer inverter.
Figure 6:
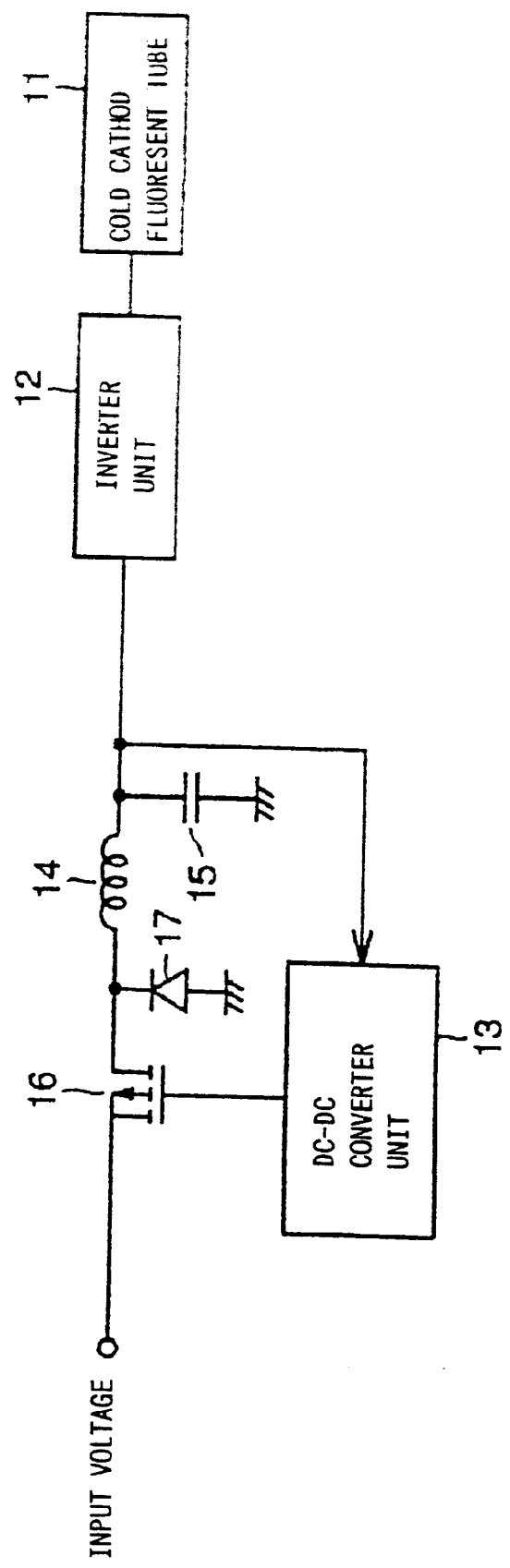
FIG. 6 is a block diagram showing an example for solving the problems in the conventional piezoelectric transformer inverter.

Additionally, in this embodiment, the chopper output is rectified by the coil L1 and the capacitor C1 to supply power source to the inverter-unit control circuit 21 of the inverter unit 20. Since extremely small amounts of current for driving the inverter-unit control circuit 21 flows into the coil L1 and the capacitor C1, it is possible to use an LC with a smaller capacity than the LC used as a DC-DC converter shown in FIG. 5, which is described above, whereby there are almost no disadvantages in terms of cost, size, and performance. Normally, a constant voltage by a feedback control is supplied to the inverter IC, and also even when input abruptly changes, no large voltage results. Accordingly, the withstand voltage of the inverter IC can be reduced, whereby a high cost-performance process having low power consumption and high speed, such as CMOS (withstand voltage is about 7V), can be used.

Meanwhile, regarding the PWM-IC32, use of the one usually incorporated in a DC-DC converter or the like leads to a relative cost reduction, and it has no difficulty in responding to voltage (through 20V) of an AC adapter or the like of a notebook-size personal computer. Furthermore, in the embodiment of this invention, the structure including two ICs as the PWM-IC32 and the one for the inverter-unit control circuit 21 can be formed, whereby there is an advantage in which high performance can be obtained while achieving a highly reliable structure in low cost, although there is a disadvantage in terms of size.

As described above, according to this invention, when a feedback control by the PWM feedback control circuit is impossible, a restriction is given to make the ON-duty of the chopper unit no greater than a specific amount, and the restricted duty is changed according to input voltage. Therefore, when the invention is applied in a notebook-size personal computer or the like, even if input voltage abruptly changes, increase of the chopper-unit average output voltage can be suppressed. In addition, a low-withstand voltage component can be used as a switching transistor of the inverter unit, so that low cost and high efficiency can be achieved. Moreover, the two integrated-circuit structure including the inverter control circuit and the PWM feedback control circuit permits a PWM-IC with low cost and high withstand voltage to be used, and a device of low withstand voltage but high performance such as CMOS can be used in the inverter unit. In this arrangement, the overall performance of the inverter can be higher, whereas cost increase can be suppressed, and it is possible to respond to the wide range of input voltage.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A piezoelectric transformer inverter comprising:
   an inverter unit including a ceramic piezoelectric transformer whose secondary terminal is to be connected to a fluorescent tube, a drive unit which is connected to a primary terminal of the ceramic piezoelectric transformer, and an inverter control circuit for controlling luminance of the fluorescent tube to a desired value;
   a step-down chopper unit for inputting a signal to the drive circuit of the inventor unit, the chopper unit including a switching device which is connected between an input voltage and a free wheeling device, and a pulse width modulation feedback control circuit connected to the switching device for providing feedback control thereto to maintain an average voltage of a rectangular-wave output voltage of the switching device constant; and
   means for restricting the duty cycle of the chopper unit so that it is not greater than a given amount.

2. The piezoelectric transformer inverter according to claim 1, wherein the inverter control circuit and the PWM feedback control circuit are each controlled by respective integrated circuits.

3. The piezoelectric transformer inverter according to claim 1, wherein the means for restricting duty cycle includes a dead time setting voltage generator circuit connected to the pulse width modulation circuit.

4. The piezoelectric transformer inverter according to claim 3, wherein the switching device is an FET.

5. The piezoelectric transformer inverter according to claim 4, wherein the free wheeling device is a diode.

6. The piezoelectric transformer inverter according to claim 3, further comprising a low pass filter having an input connected to an output of the FET and an output connected to the inverter unit.

7. The piezoelectric transformer inverter according to claim 6, wherein the output of the filter is fed back to the pulse width modulation circuit through a voltage divider.

\* \* \* \* \*